July 5, 1966    J. MANNISI    3,259,416
COLLAPSIBLE PLATE HOLDER
Filed May 18, 1964
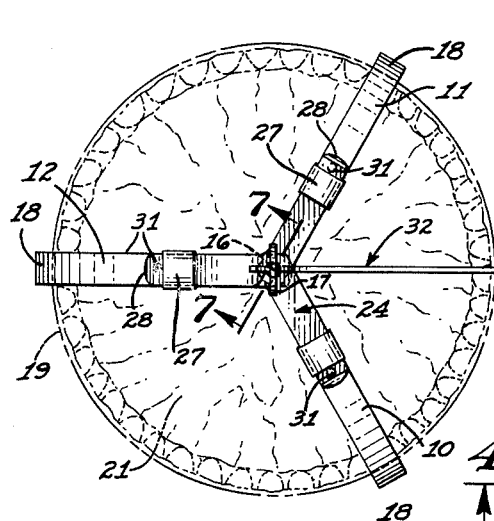
Fig. 1
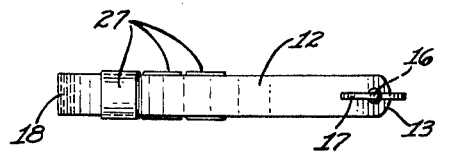
Fig. 6
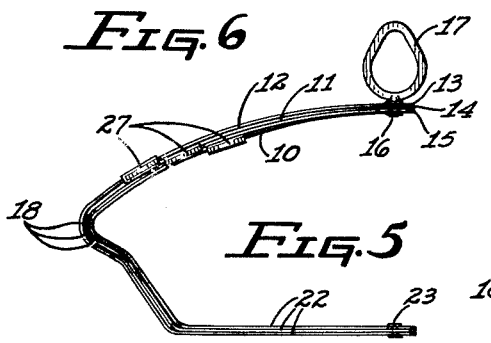
Fig. 5
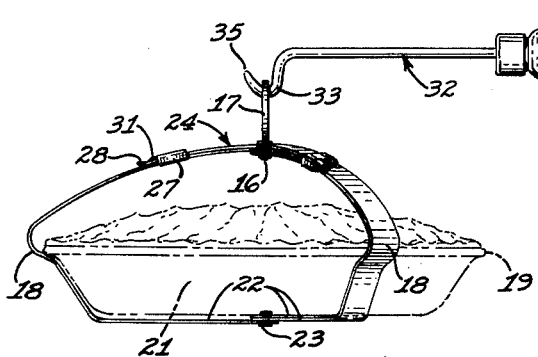
Fig. 2
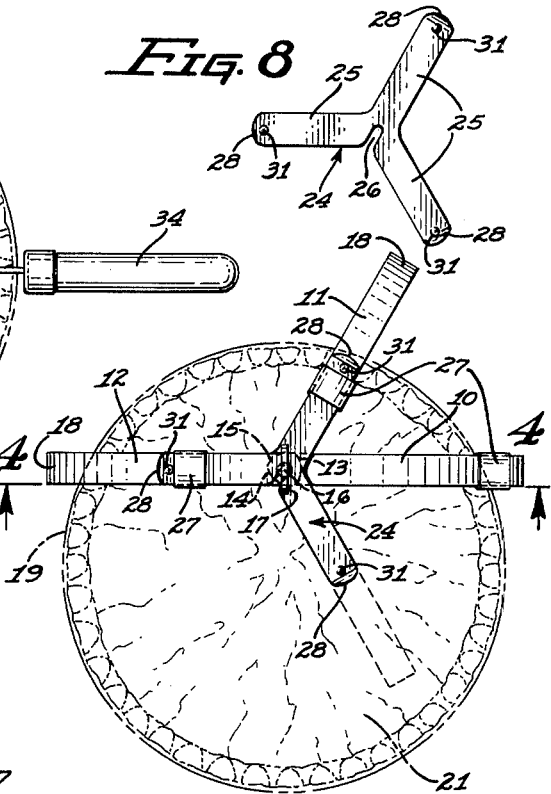
Fig. 8
Fig. 3
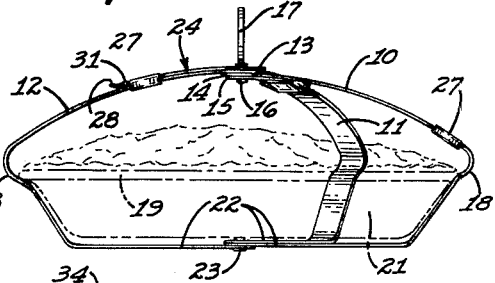
Fig. 4
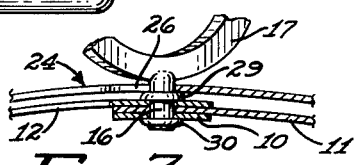
Fig. 7
INVENTOR.
JOSEPH MANNISI.
BY
ATTORNEY.

United States Patent Office 3,259,416
Patented July 5, 1966

3,259,416
COLLAPSIBLE PLATE HOLDER
Joseph Mannisi, 1341 W. Woodland Ave., Phoenix, Ariz.
Filed May 18, 1964, Ser. No. 368,196
3 Claims. (Cl. 294—29)

The present invention relates to a device for the convenient handling of a pie plate or the like with contents for deposit in an oven and for the safe removal of the heated plate and contents from an oven.

An object of the invention is to provide a plurality of support members arranged and constructed for relative movement to support a plate and for adjustment for handling when not in use.

A further object is to provide what may be termed a pie rack crown having a plurality of movable pivoted arms which may be locked in fixed space relation to provide a plate support and adjustable into a compact unit for storage.

A still further object is to provide a pie plate holder which may be engaged by an elongated rod for safe removal of the plate and contents from a heated oven.

Other objects and advantages will be more fully understood from the following description and the accompanying drawings in which:

FIG. 1 is a plan view of a plate and contents disposed in the rack ready for deposit into or removal from the oven by means of a lifter rod having a hand piece and showing means for locking the movable members in fixed relation;

FIG. 2 shows a side elevational view of FIG. 1;

FIG. 3 is a view of the rack with the parts adjusted for the removal of the plate and contents;

FIG. 4 is a side elevational view partly in section on line 4—4 of FIG. 3.

FIG. 5 shows the movable parts in overlapping relation;

FIG. 6 is a top plan view of FIG. 5;

FIG. 7 is an enlarged sectional view taken on line 7—7 in FIG. 1, and

FIG. 8 is a top plan view of a locking member for holding the movable rack parts in fixed relation.

As shown in the drawing, the present invention includes three arms or retainer members 10, 11 and 12, the normal upper portions or ends 13, 14 and 15 being of arcuate form and held in movable relation by a pivot pin 16 integral with an eyelet 17. Each arm is formed with a reverse bend 18 to overlap the edge 19 of a plate 21 and extending to form base portions 22 held in pivotal relation by pin 23. By means of pivots or pins 16 and 23 the arms are free to move relative to each other in spaced relation to support a plate as shown in FIGS. 1 and 2 or closed in collapsed relation for storage as shown in FIGS. 5 and 6. When the plate is supported by the arms 10, 11 and 12, it is desirable that they be locked against relative movement. A locking member 24 therefore is provided having three fingers 25 of equal length and extending in equal angular relation to each other for contact with the arms or retainer members when the latter are in position about the plate 21. The locking member is formed with a slot 26 to receive the pivot pin 16 to position the fingers 25 in alignment with arms 10, 11 and 12. Each of the arms is provided with a slide member 27. When the fingers are in place in contact with the arms the slide members are moved to surround the ends of the arms thereby locking the arms in fixed relation. Each finger of the locking member 24 is formed with a boss 28 which aids in retaining the slide members about the arms. As shown, the fingers of the locking member are spaced apart in such relation as to hold the arms 10, 11 and 12 in locked spaced relation.

As shown more clearly in FIG. 7, the pin 16 of the eyelet 17 is formed with flanges 29 and 30 between which the ends of arms 10, 11 and 12 are pivoted. The locking member 24, when in position, is disposed between the eyelet 17 and flange 29. At the free end of each of the fingers 25 is a bead 31 over which a slide member is forced when the arms are in position to hold the plate ready to be lifted.

When a plate has the ingredients of a pie therein ready to be baked, the arms of the holder are positioned as in FIG. 1 with the locking member in position and the slide members moved to engage ends of the locking members. The plate may then be lifted by means of an elongated rod 32 having a hook portion 33 at one end and a hand piece 34 and deposited in an oven. When ready for removal, the rod 32 may again be employed to position the hook 33 in the eyelet 17 and the pan or plate removed. The rod may again be used to engage the end 35 of the hook to slide one of the slide members 27 to release an arm which later may be moved, as shown in FIG. 3, to permit the removal of the plate and contents. When the arms have cooled for handling, the remaining slide members may be moved to release the arms and the locking member removed. The arms may then be adjusted or collapsed as shown in FIG. 5 for storage.

Although a preferred embodiment of the invention is shown and described, it will be understood that modification may be made therein without departing from the spirit and scope of the appended claims.

What is claimed is:

1. A device for depositing a plate and contents in an oven for baking and for removal while heated, comprising three movable arms, each of said arms having a base portion for contact with the under side of said plate and a reverse bend to overlap the edge portion of said plate, pivot means connecting the ends of the base portions of said arms, a pivot pin connecting the other ends of said arms, said pivot pin having an eyelet integral therewith, a locking member having three spaced apart fingers for contact with said movable arms, each of said arms having a slide member to engage a finger to lock said arms in fixed spaced relation about said plate, a hand piece having a hook portion for engaging said eyelet for the manual deposit or removal of said device into or from said oven.

2. A device for depositing a plate and contents in an oven for baking and for removal while heated, comprising three movable arms, each of said arms having a base portion for contact with the under side of said plate and a reverse bend for overlapping the edge portion of said plate, pivot means connecting the base portions of said arms, a pivot pin connecting the other ends of said arms, said pivot pin having an eyelet integral therewith, a locking member rotatable about said pivot pin, said locking member having three fingers spaced apart in fixed spaced relation for contact with said movable arms, slide members movable to secure said arms to said fingers and movable to release an arm for movement for the insertion or removal of said plate into or from said device, and a hand piece having a hook portion for engaging said eyelet for the manual movement of said device.

3. A device for depositing a plate and contents in an oven for baking and for removal while heated, comprising three movable arms, each of said arms having a base portion for contact with the under side of said plate and a reverse bend to overlap the edge portion of said plate, pivot means connecting the ends of the base portions of said arms, a pivot pin connecting the other ends of said arms, an eyelet integral with the top portion of said device, a locking member having three spaced apart fingers for contact with said movable arms, each of said arms having a slide member to engage a finger to lock said arms in fixed spaced relation about said plate, a hand piece having a hook portion for engaging said eyelet for the manual deposit or removal of said device into or from said oven.

References Cited by the Examiner

UNITED STATES PATENTS

| | | | |
|---|---|---|---|
| 1,837,673 | 12/1931 | Raymond | 294—27 X |
| 2,102,163 | 12/1937 | Pastemack | 294—67 |

GERALD M. FORLENZA, *Primary Examiner.*

G. F. ABRAHAM, *Assistant Examiner.*